April 17, 1956  J. F. HACKING  2,742,229
GROUND MEASURING INSTRUMENT FOR WHEELED STRUCTURES
Filed April 21, 1953
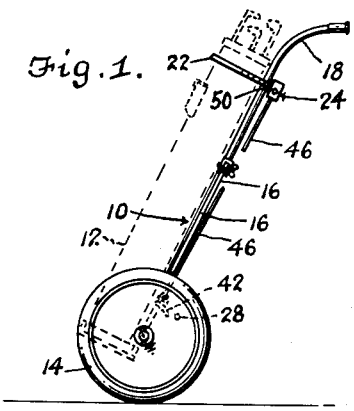
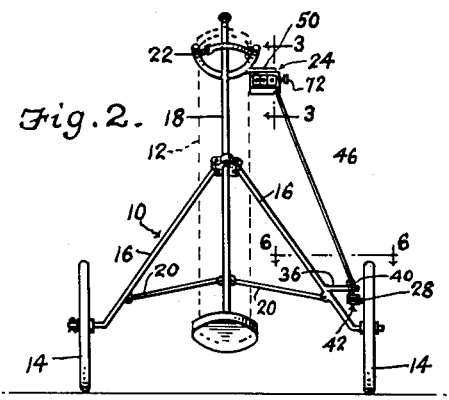
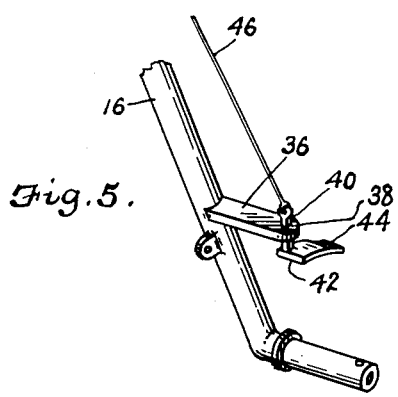
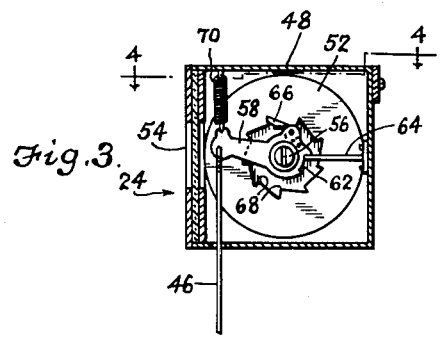
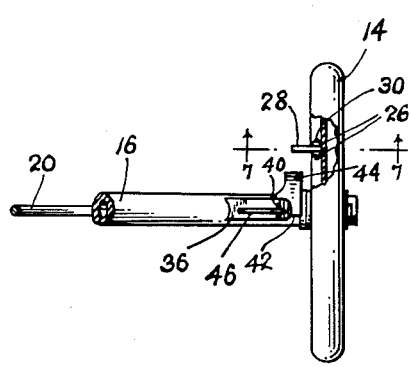
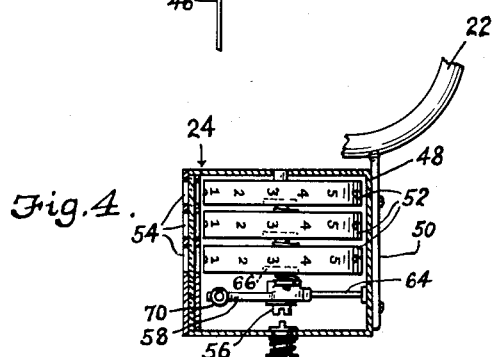
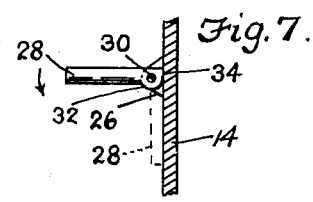
INVENTOR.
Joseph F. Hacking
BY
McMorrow, Berman & Davidson
ATTORNEYS

United States Patent Office 2,742,229
Patented Apr. 17, 1956

2,742,229

GROUND MEASURING INSTRUMENT FOR WHEELED STRUCTURES

Joseph F. Hacking, Vernal, Utah

Application April 21, 1953, Serial No. 350,129

3 Claims. (Cl. 235—95)

This invention relates to measuring devices, and more particularly, has reference to a device for measuring the lineal distance traveled by a rollable structure.

In many instances, it is desirable to know the lineal distance traveled by a rollable structure, and the main object of the present invention is to provide an improved measuring instrument adapted for association with a structure of this type, which instrument will be of simple design, will not interfere with normal use of said wheeled structure, and will be readily attached to the structure.

One instance in which a measuring instrument of the type stated is desirable is found in the sport of golf. Considerable interest is developed in this sport in the distance a ball travels on a particular shot, in terms of total lineal yardage.

Most usually, the golfer, after making a shot, walks in a substantially straight line between the point at which the shot is made and the point at which the ball comes to rest, and one important object of the present invention is to provide a measuring instrument adapted to be mounted upon a conventional golf cart, so as to permit a reading to be taken from the instrument when the ball is reached, which reading will inform the player of the lineal distance covered by the ball.

Another object of importance is to provide a device of the type stated which will include a means for actuating a meter, which means will be shiftable between operative and inoperative positions, thereby to permit the player to use the device only when he so desires.

Another object of importance is to provide a ground measuring instrument as described which will be specifically adapted for mounting upon foldable golf carts. The conventional golf cart is of a foldable construction, and the present invention utilizes, as an important component part thereof, a correspondingly foldable linkage which collapses with the cart, and which automatically assumes an operative position when the cart is unfolded for use.

Other objects will appear from the following description, the claims appended thereto, and from the annexed drawings, in which like reference characters designate like parts throughout the several views, and wherein:

Figure 1 is a side elevational view of a golf cart equipped with a ground measuring instrument formed in accordance with the present invention;

Figure 2 is a front elevational view of the golf cart and measuring instrument;

Figure 3 is a greatly enlarged sectional view taken substantially on line 3—3 of Figure 2, through the counting device or meter;

Figure 4 is a sectional view on line 4—4 of Figure 3;

Figure 5 is a fragmentary perspective view of the foldable frame of the golf cart, and of an associated portion of the ground measuring instrument;

Figure 6 is an enlarged sectional view on line 6—6 of Figure 2; and

Figure 7 is an enlarged sectional view on line 7—7 of Figure 6.

The reference numeral 10 has been applied generally in the drawing to a conventional golf cart. In this connection, although the invention has been illustrated in association with a golf cart, it should be noted at this point that the measuring instrument could be used with equal facility on other wheeled structures, for the purpose of determining the lineal distance traveled by said structures.

The golf cart 10, as is usual, has means for supporting thereupon a conventional golf bag designated generally by the reference numeral 12, and shown in dotted outline in the drawing. The golf cart, further, includes a pair of transversely spaced ground wheels 14 rotatably mounted upon the outer ends of wheel spindles 16 pivotally connected at their inner ends to a stem 18.

Additionally, links 20 are provided as part of the golf cart frame, said links being pivotally connected at one end to the spindles 16 and having a slidable, pivotal connection at their inner ends to the stem 18.

The stem, at its upper end, has an arcuate yoke 22 providing a seat for the upper end of the supported golf bag 12.

The golf cart illustrated and described is of conventional design and does not, per se, constitute part of the present invention. It will be appreciated that the parts 16, 18, 20, and 22 constitute a foldable frame, on which the ground wheels 14 are rotatably mounted.

The measuring instrument constituting the present invention has been designated generally by the reference numeral 24, and is actuated by rotation of a selected ground wheel 14. It will be appreciated, in this regard, that the ground wheels 14 are of determined circumference, and each wheel could, for example, have a circumference of exactly one yard.

In any event, the invention includes a pair of ears 26 fixedly secured to the selected ground wheel 14, at a location spaced outwardly from the center of rotation of the wheel. A finger 28 is pivotally connected to and between ears 26 by means of a pivot pin 30 (Figure 7). Finger 28, at its inner end, has a rounded surface 32 concentric with the pivot axis of the finger, said rounded surface merging into a straight surface 34 which, when the finger 28 is swung outwardly to the position thereof shown in Figure 7, will bind against the wheel 14, so as to limit outward swinging movement of said finger. Additionally, the flat surface 34 constitutes means frictionally engaging the wheel, for holding the finger 28 in its outwardly swung position. Of course, if it is desired to dispose the finger 28 inoperatively, it is merely necessary that the finger be swung in the direction of the arrow shown in Figure 7, to a position to which it lies against the wheel. In this inoperative position of the finger, the measuring instrument will not be actuated.

Adjacent the selected ground wheel 14, a bracket 36 is fixedly secured to the outer end portion of the spindle 16 on which said ground wheel is mounted. The bracket 36 extends in the direction of the ground wheel, and as shown in Figure 5, has at its free end an opening 38 of non-circular cross section, in which is slidably mounted a short arm 40 of complementary cross section, rigid at its lower end with a cam 42 having an arcuate cam surface 44 eccentric to the center of rotation of the wheel 14.

The particular disposition of the arcuate cam surface 44 is such as to cause the finger 28, on each cycle through which the finger is rotated, to ride onto the cam surface 44. As the finger 28 continues through its circular path about the center of rotation of wheel 14, the cam 42 will be depressed, by reason of the eccentric disposition of cam surface 44 relative to said center of rotation. The particular arrangement of the finger 28 and cam 42 has been illustrated to particular advantage in Figure 1.

Due to this construction, the cam 42 will be depressed once during each rotation of the wheel 14, depression of the cam being effective to shift the arm 40 downwardly within its associated opening 38.

Connected to the upper end of arm 40 is one end of an elongated connecting element 46. Element 46 can comprise a flexible steel cable, or cord, the element being of a flexible formation so as to permit said element to be collapsed when the frame is folded.

The other end of the element 46 extends through an opening formed in a rectangular meter casing 48, fixedly connected to a laterally projected bracket arm 50 rigid with one end portion of yoke 22.

The casing 48 constitutes a housing for a conventional counting device, that includes a plurality of side by side wheels 52 having peripheral series of indicia thereof arranged to be viewed through sight openings 54. Since counting devices of this type are, per se, already known, it is not thought necessary to describe the construction and operation of the wheels 52 in detail herein. It is believed sufficient to note that the indicia represent the number of yards of lineal distance traveled by the wheeled structure 10, with each wheel 52 being given a one step advancement responsive to a predetermined number of revolutions of the wheel 52 preceding the same.

The several wheels 52 are mounted upon a shaft 56, and pivotally mounted on said shaft is a radial arm 58, said arm 58 being integral with a disc 60 having an opening through which the shaft extends. Disc 60 has a peripheral recess 62 in which is engaged a stop member 64 fixedly connected to the inner surface of the casing wall. The stop member 64 limits swinging movement in opposite directions of the arm 58.

Carried by the disc 60 is a pawl 66, said pawl being spring biased outwardly of the disc and being pivotally connected to said disc. The pawl 66 is engageable against the edge of a relatively large recess formed in the adjacent side of the nearest wheel 52, said recess having its edge formed with a continuous series of ratchet teeth 68.

It is thus apparent that each downward swinging movement of arm 58 will be effective to cause a one step advancement of the ratchet means associated with the counting device, and therefore, during continuous rotation of ground wheel 14, step by step motion of the ratchet means of the counting device results, causing the counting device to provide a reading as to the lineal distance traveled by the wheeled structure, in terms of yards.

A pull back spring 70 is connected to the outer end of the arm 58, said spring being hooked upon the wall of the casing 48. The spring 70 normally holds the arm 58 in the position thereof shown in Figure 3, it being understood that depression of the cam 42 is against the restraining action of the pull back spring.

As is usual, the counting device is provided with a reset knob 72 mounted in the wall of casing 48 for in-and-out movement, said reset knob being normally spring biased outwardly of the casing but being provided, at its inner end, with a tongue engageable in a kerf formed in the adjacent end of shaft 56. Reset knob 72, when engaged with shaft 56, is adapted to permit the several wheels or dials to be reset at a zero position.

It is apparent that the construction illustrated and described is one that permits the player to make use of the measuring instrument only when he so desires. In other words, by swinging the finger 28 inwardly against the associated wheel 14, the player prevents the measuring instrument from going into operation. If, however, the player desires to use said instrument, he need only swing the finger 28 outwardly. Movement of the golf cart will then cause each cycle of finger 28 to be translated into a single reciprocating movement of the connecting linkage constituted by cam 42, element 46, and pawl assembly 58, 60, 66. Said connecting linkage thus acts as a triggering means to actuate the counting device.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a ground measuring instrument for determining lineal distances the combination, with a rollable structure including a foldable frame and a ground wheel of determined circumference, of a finger pivotally connected to said wheel at a location spaced from the center of rotation thereof so as to travel through a circular path about said center on rotation of the wheel, said finger being swingable between an operative position in which it projects outwardly from the wheel and an inoperative position against the wheel; a counting device mounted on the frame remote from said wheel and including a ratchet means having a step by step motion; and triggering means for actuating said device to provide a reading as to the lineal distance traveled by said structure, including a cam depressed by the finger in the operative finger position on each cycle through which the finger is rotated, and a connecting linkage extending from said cam to the counting device and including a pawl arranged for imparting a one step advancement to the ratchet means responsive to each depression of the cam, said linkage additionally including a collapsible connecting element folding with said frame.

2. In a ground measuring instrument for determining lineal distances the combination, with a golf cart including a transversely foldable frame and a ground wheel of determined circumference rotatably mounted on and folding with said frame, of a finger pivotally connected to said wheel at a location spaced from the center of rotation thereof so as to travel through a circular path about said center on rotation of the wheel, said finger being swingable between an operative position in which it projects outwardly from the wheel and an inoperative position against the wheel; a counting device mounted on the frame remote from said wheel and including a ratchet means having a step by step motion; and triggering means for actuating said device to provide a reading as to the lineal distance traveled by said cart, including a cam depressed by the finger in the operative finger position on each cycle through which the finger is rotated, and a connecting linkage extending from said cam to the counting device and including a pawl assembly arranged for imparting a one step advancement to the ratchet means responsive to each depression of the cam, said linkage including a connecting element extending between the pawl assembly and cam, said element being of flexible formation so as to fold with the frame.

3. In a ground measuring instrument for determining lineal distances the combination, with a golf cart including a stem, a yoke at one end of the stem providing a seat for a supported golf bag, a pair of wheel spindles projecting laterally in opposite directions from the stem at a location thereon spaced from the yoke longitudinally of the stem, said spindles being pivotally connected at one end to the stem so as to swing toward and away from the stem to collapsed and extended positions respectively, and ground wheels rotatably mounted upon the other ends of the spindles, of a finger attached to one of the ground wheels at a location spaced from the center of rotation thereof so as to travel through a circular path about said center on rotation of the wheel, said finger projecting laterally from the wheel in the direction of the spindle on which said wheel is mounted; a counting device secured to said yoke and spaced laterally of the stem, at the same side of the stem as said finger-provided wheel, said counting device including a ratchet means having a step-by-step motion; a bracket fixedly secured to said other end of said spindle and projecting laterally of the spindle in the direction of said one ground wheel, the bracket having an opening; a support arm slidably mounted in said opening for up and down movement; a cam secured fixedly to the support arm and having an arcuate cam surface eccentric to the center of rotation of said one wheel, said cam surface being disposed for riding of the finger thereonto on each cycle through which the finger is rotated, for depression of the cam once during each of said cycles to cause downward movement of the arm in said opening; an elongated connecting element connected between said ratchet means and arm, said element being taut in the extended positions of the wheel spindles, whereby to actuate said ratchet means once during each cycle of rotation of said one wheel responsive to pull exerted upon said element by downward movement of the arm, said element flexing into a slack condition responsive to inward swinging of the spindles to collapsed position; and spring means associated with said connecting element and tensioned to yieldably oppose downward movement of the arm and element, whereby to shift said element, arm, and cam upwardly on disengagement of the cam from the finger during each cycle of rotation of said finger.

References Cited in the file of this patent

UNITED STATES PATENTS

| | | |
|---|---|---|
| 543,269 | Ruff | July 23, 1895 |
| 588,726 | Burdick | Aug. 24, 1897 |
| 2,518,803 | Marvin | Aug. 15, 1950 |
| 2,571,682 | Cochnar | Oct. 16, 1951 |
| 2,711,027 | Williamson | June 21, 1955 |